United States Patent [19]
Forsyth

[11] Patent Number: 5,975,263
[45] Date of Patent: *Nov. 2, 1999

[54] SYNCHRONIZER CLUTCH

[75] Inventor: John R. Forsyth, Romeo, Mich.

[73] Assignee: New Venture Gear, Inc., Troy, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/056,424

[22] Filed: Apr. 7, 1998

Related U.S. Application Data

[63] Continuation of application No. 08/734,765, Oct. 21, 1996, Pat. No. 5,735,767.

[51] Int. Cl.⁶ .................................................. F16D 23/06
[52] U.S. Cl. ................................... 192/53.32; 192/53.34; 74/339; 74/411.5
[58] Field of Search .............................. 192/53.32, 53.34, 192/219, 18 R; 74/411.5, 339; 475/315, 316

[56] References Cited

U.S. PATENT DOCUMENTS

| | | | |
|---|---|---|---|
| 2,930,462 | 3/1960 | Willis | 192/53.32 |
| 3,543,897 | 12/1970 | Lemke et al. | 74/339 X |
| 4,225,024 | 9/1980 | Kuzma | 192/53.32 |
| 4,294,338 | 10/1981 | Simmons | 192/18 R X |
| 4,413,715 | 11/1983 | Michael et al. | 192/53.34 X |
| 4,528,872 | 7/1985 | Umemoto et al. | |
| 4,567,788 | 2/1986 | Miller | |
| 4,598,599 | 7/1986 | Ikemoto | 71/411.5 |
| 4,676,123 | 6/1987 | Kubo et al. | |
| 4,798,103 | 1/1989 | Eastman et al. | |
| 4,830,159 | 5/1989 | Johnson et al. | 192/53.34 X |
| 5,085,303 | 2/1992 | Frost | 192/53.32 |
| 5,397,282 | 3/1995 | Weidman | |
| 5,466,195 | 11/1995 | Nogle et al. | |
| 5,503,603 | 4/1996 | Adam et al. | |
| 5,651,435 | 7/1997 | Perosky et al. | 192/53.34 X |

FOREIGN PATENT DOCUMENTS

| | | |
|---|---|---|
| 977531 | 12/1964 | United Kingdom |
| 1014621 | 12/1965 | United Kingdom |
| 1378910 | 12/1974 | United Kingdom |

*Primary Examiner*—Richard M. Lorence
*Attorney, Agent, or Firm*—Harness, Dickey & Pierce, P.L.C.

[57] ABSTRACT

A synchronizer clutch having a first member, a second member, and a clutch pack. The clutch pack includes a first clutch plate fixed to the first member and a second clutch plate fixed to the second member. The synchronizer clutch further includes a clutch hub fixed to the first member, a first ring located between the clutch hub and the clutch pack, and a second ring frictionally engaging said first ring. A shift sleeve is mounted for rotation with the clutch hub and sliding movement thereon between a first and second position. In the first position, the shift sleeve uncouples the first member from the second member to enable relative rotation therebetween. In the second position, the shift sleeve couples the first member to the second member for preventing relative rotation therebetween. Movement of the shift sleeve from the first position to the second position causes the shift sleeve to engage the second ring which, in turn, causes the first ring to move for exerting a compressive clamping force on the clutch pack.

3 Claims, 4 Drawing Sheets

SYNCHRONIZER CLUTCH

This is a continuation application of U.S. patent application Ser. No. 08/734,765, filed Oct. 21, 1996 now U.S. Pat. No. 5,735,767.

BACKGROUND OF THE INVENTION

This invention relates generally to transmissions for use in motor vehicles and specifically to a synchronizer clutch having a multi-plate clutch pack for use in motor vehicles.

Synchronizers are well known in the art for selectively coupling the gears of a vehicle power transmission device to enable smooth shifting between differing gear ratios. However, a need exists in the relevant art to provide a synchronizer clutch capable of quickly synchronizing and coupling a preferred set of gears.

SUMMARY OF THE INVENTION

Accordingly, the present invention is directed to a synchronizer clutch having a multi-plate clutch pack for use in motor vehicles and which is capable of quickly and conveniently coupling a preferred set of gears.

The synchronizer clutch of the present invention includes a first member, a second member, and a clutch pack. The clutch pack includes a first clutch plate fixed to the first member. The clutch patch further includes a second clutch plate fixed to the second member. The synchronizer further includes a clutch hub fixed to the first member, a first ring located between the clutch hub and the clutch pack, and a second ring frictionally engaging said first ring. A shift sleeve is lastly provided for movement between a first and second position. The shift sleeve is supported on the clutch hub. In the first position, the shift sleeve uncouples the first member and second member to enable relative rotation therebetween. In the second position, the shift sleeve couples the first member and second member and prevents relative rotation therebetween. When it is desired to shift from the first position to the second position, the shift sleeve engages the second ring, which causes the first ring to move for exerting a compressive clamping force on the clutch pack.

DETAILED DESCRIPTION OF THE INVENTION

Figure 1:
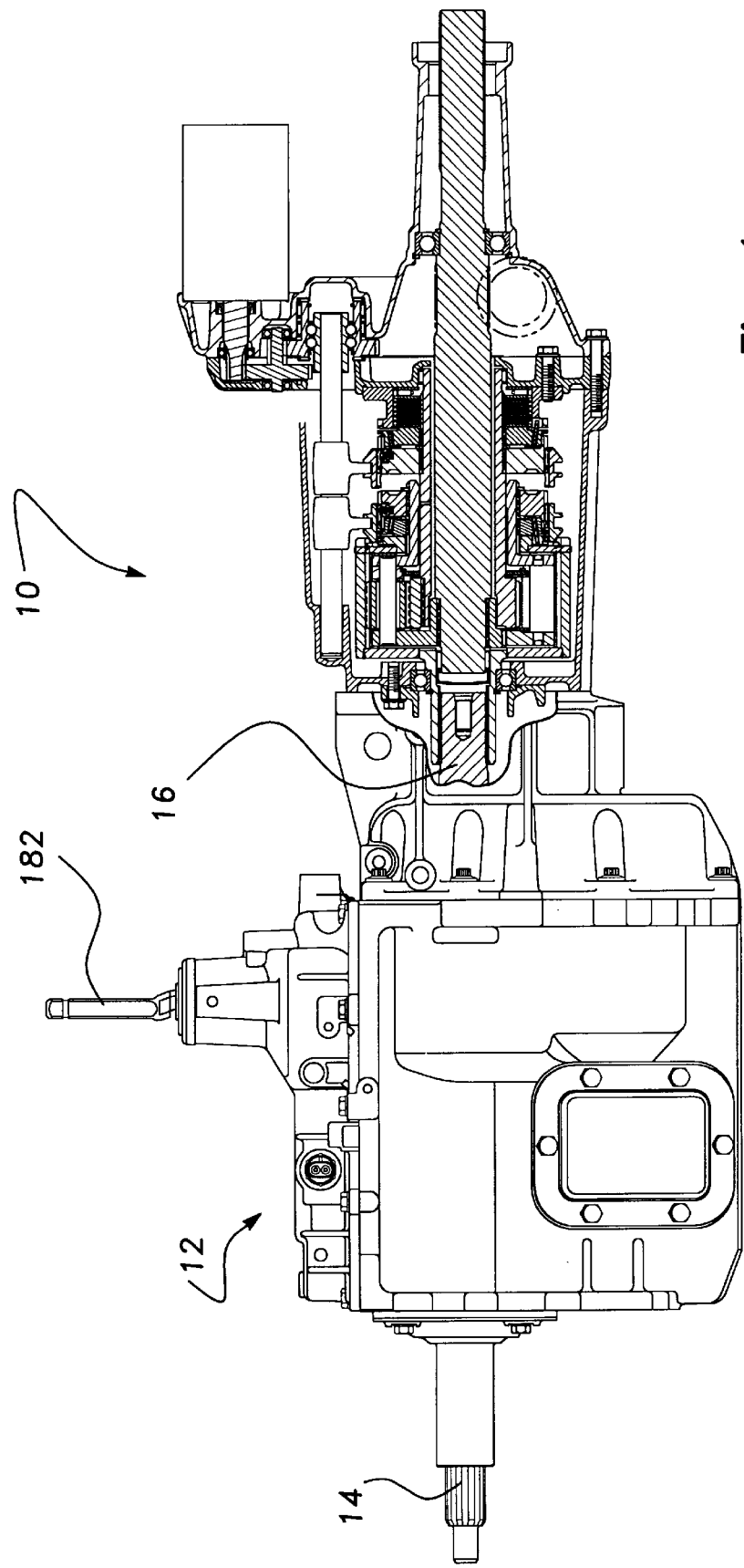
FIG. 1 is an elevational view, partially in section, showing the two-speed compounder of the present invention mounted to a manual transmission.

With particular reference to FIG. 1 of the drawings, a preferred embodiment of a two-speed compounder 10 is shown bolted to a multi-speed transmission 12 of the type having a predetermined number of forward gear ratios and a reverse gear ratio. In accordance with the best mode currently contemplated for use of compounder 10, transmission 12 is a five-speed manual gearbox having an input shaft 14, an output shaft 16, and a plurality of gearsets (not shown) that can be selectively engaged for driving output shaft 16 at one of the five available forward speed ratios and the reverse speed ratio relative to input shaft 14. Reference can be made to the Model No. NV4500 transmission manufactured by New Venture Gear, Inc., the assignee of this application, for an exemplary five-speed manual gearbox to which two-speed compounder 10 can be mounted. Since, however, two-speed compounder 10 is operable for establishing at least one additional speed ratio, those skilled in the transmission art will recognize that two-speed compounder 10 can be used with virtually any rear wheel drive multi-speed gearbox.

Figure 2:
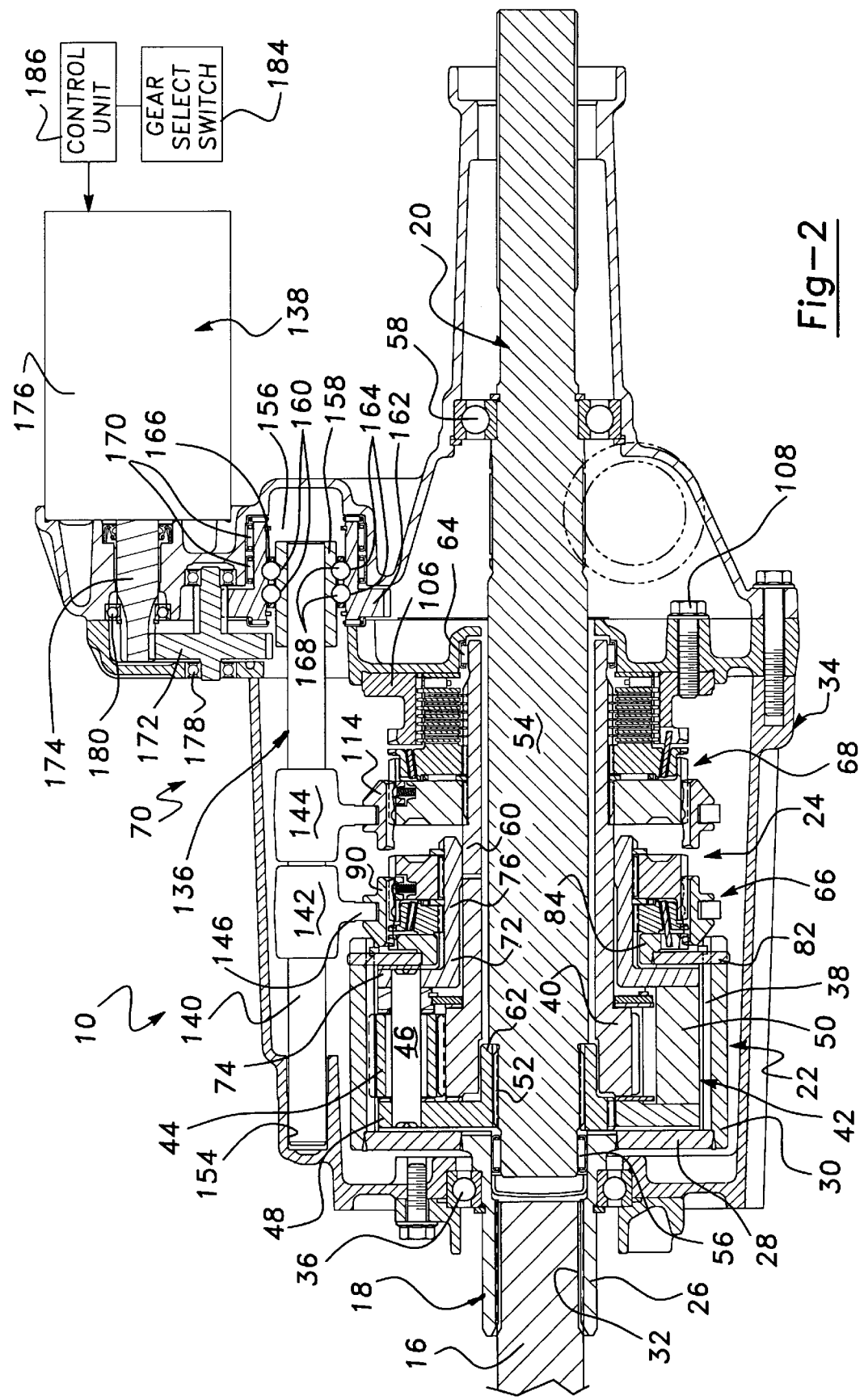
FIG. 2 is an enlarged view of the two-speed compounder shown in FIG. 1.

As best seen from FIG. 2, two-speed compounder 10 includes an input 18 adapted for coupled engagement with transmission output shaft 16, an output 20 adapted for conventional interconnection to a vehicle's rear driveline, a planetary gearset 22 operably disposed between input 18 and output 20, and a power transfer mechanism 24 for selectively establishing one of two different drive connection between input 18 and output 20. As shown, input 18 includes a tubular shaft segment 26, a radial plate segment 28 fixed (i.e., welded) to shaft segment 26, and a cylindrical drum segment 30 fixed (i.e., welded) to plate segment 28. Shaft segment 26 is fixed via a splined connection 32 to transmission output shaft 16 and is rotatably supported from a portion of compounder housing 34 by a bearing assembly 36. Internal gear teeth are formed on drum segment 30 to define a ring gear 38 that is a component of planetary gearset 22. Additional components of planetary gearset 22 include a sun gear 40 and a planet carrier assembly 42. Planet carrier assembly 42 includes a plurality of pinion gears 44 (one shown) that are rotatably supported on pinion shafts 46 extending between a front carrier ring 48 and a rear carrier ring 50. Each pinion gear 44 is meshed with ring gear teeth 38 and sun gear 40. As seen, front carrier ring 48 is fixed via a splined connection 52 to output 20 which is shown to be an elongated output shaft 54. A front end portion of output shaft 54 is supported in shaft segment 26 of input 18 via a bearing assembly 56 while its rearward end portion is rotatably supported from housing 34 via a bearing assembly 58. Furthermore, sun gear 40 is shown to include an elongated tubular shaft segment 60 that is concentrically positioned on output shaft 54 and has its forward end journally supported on an axial hub segment 62 of front carrier ring 48 while its rearward end is supported from housing 34 by a bearing assembly 64.

In general, power transfer mechanism 24 includes a first synchronizer clutch 66 that is operable for selectively coupling planet carrier assembly 42 to ring gear 38 to establish the first drive connection, a second synchronizer clutch 68 that is operable for selectively coupling sun gear 40 to housing 34 to establish the second drive connection, and a mode shift apparatus 70 for controllably actuating synchronizer clutches 66 and 68. As will be detailed, when the first drive connection is established, compounder output shaft 54 is rotatably driven at a direct speed ratio relative to compounder input 18. However, when the second drive connection is established, compounder output shaft 54 is rotatably driven at a reduced speed ratio relative to compounder input 18. The particular reduced speed ratio is dependent on the gearing associated with planetary gearset 22. According to a preferred arrangement, sun gear 40 has fifty-three teeth, ring gear 38 has ninety-one teeth and pinion gears 44 have nineteen teeth, thereby establishing a reduced or underdrive ratio of about 1.582. Those skilled in the transmission art will appreciate that the reduction ratio can be engineered to suit each particular transmission application.

Figure 3:
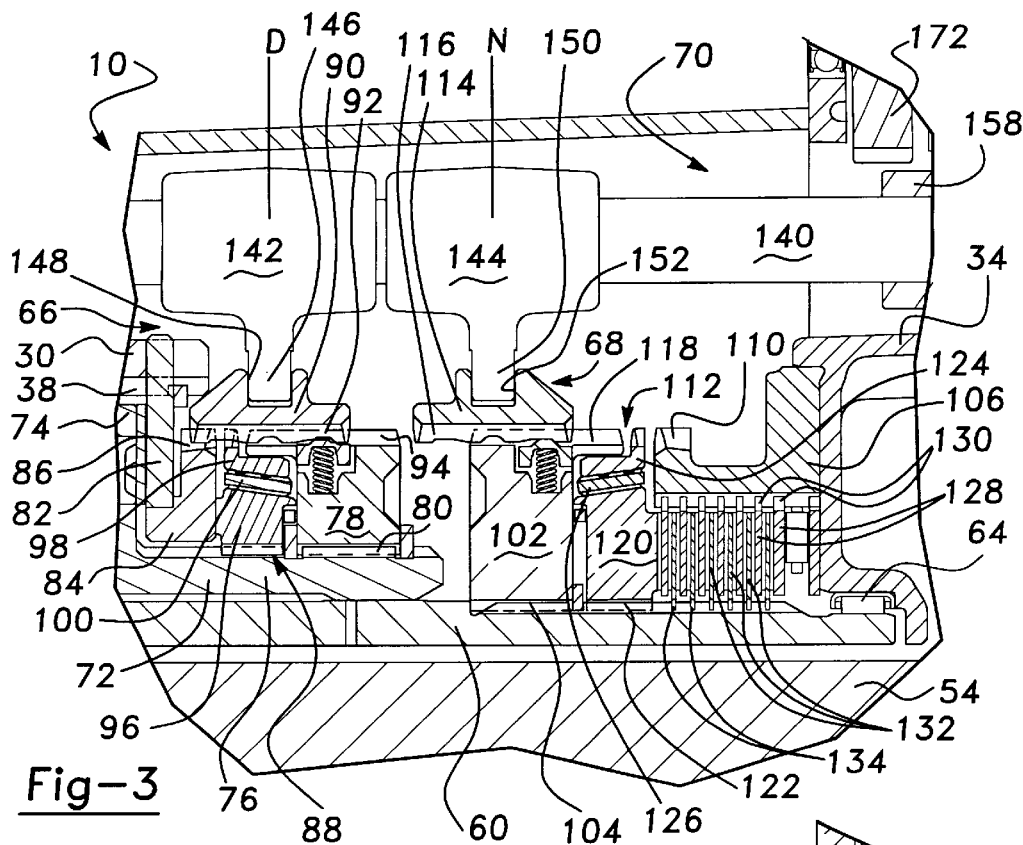
FIG. 3 is a further enlarged fragmentary view of FIG. 2 showing the components of the mode shift apparatus positioned to provide a direct-drive mode.
Figure 4:
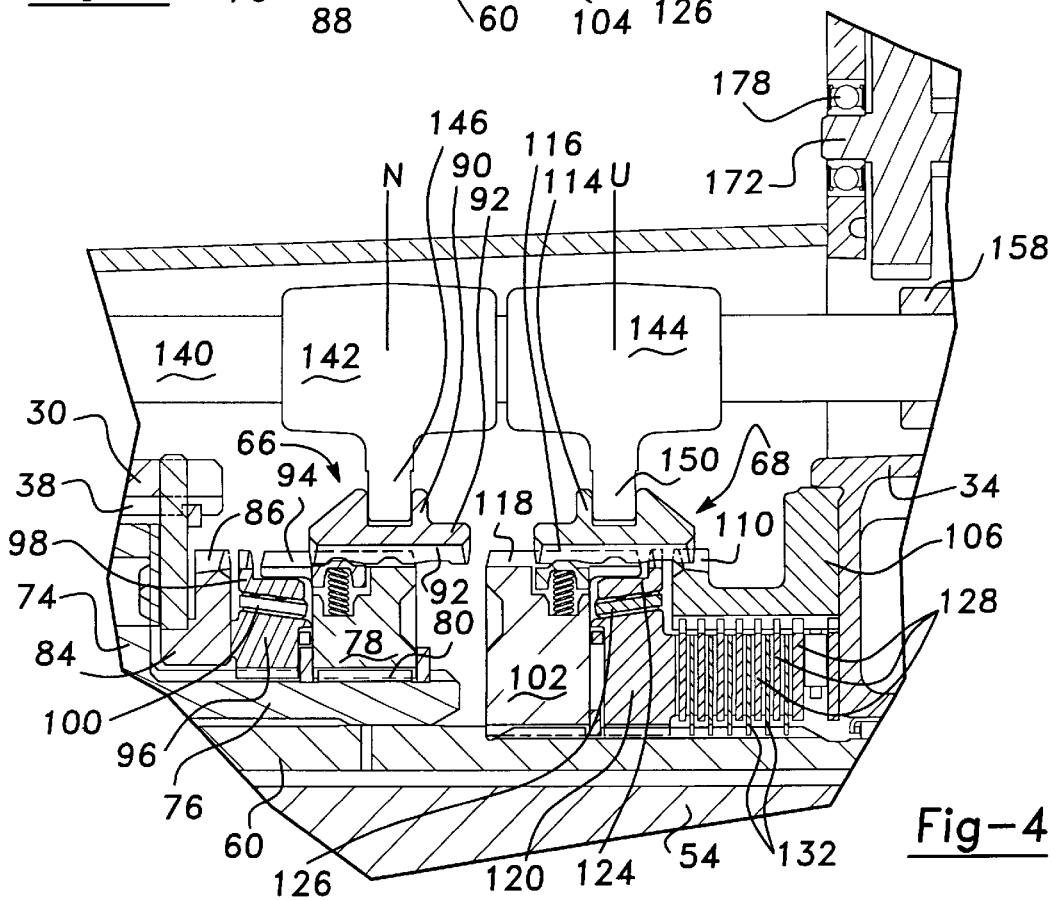
FIG. 4 is a view, similar to FIG. 3 showing the components of the mode shift apparatus positioned to provide an underdrive mode.

As noted, first synchronizer clutch 66 is operable for selectively coupling carrier assembly 42 to ring gear 36. In particular, planet carrier assembly 42 is shown to further include a bell-shaped carrier hub 72 having a radial segment 74 to which pinion shafts 46 are secured and an elongated axial segment 76 that is journally supported on shaft segment 60 of sun gear 40. Carrier hub 72 can alternatively be constructed as an integral portion of rear carrier ring 50. Referring primarily to FIGS. 3 and 4, first synchronizer clutch 66 is shown to include a clutch hub 78 fixed via a splined connection 80 to axial segment 76 of carrier hub 72, an output plate 82 fixed (i.e., splined) to ring gear 38, a clutch ring 84 fixed to output plate 82 and having clutch teeth 86 formed thereon, a first synchronizer assembly 88 interposed between clutch hub 78 and output plate 82, and a first shift sleeve 90. First shift sleeve 90 has longitudinal internal splines 92 that are meshed with longitudinal external splines 94 formed on clutch hub 78 such that first shift sleeve 90 is supported for rotation with and axial sliding movement on first clutch hub 78 between positions of engagement and disengagement relative to clutch teeth 86. First synchronizer assembly 88 is shown as a dual-cone, strut-type unit that is operable for causing speed synchronization between ring gear 38 and planet carrier assembly 42 prior to movement of shift sleeve 90 to its engaged position. First synchronizer assembly 88 includes an inner cone ring 96 splined to carrier hub 72, a blocker ring 98, and an intermediate cone ring 100. First shift sleeve 90 is movable between a neutral position (N) whereat its internal spline teeth 92 are released from engagement with clutch teeth 86 and a direct drive (D) position whereat its spline teeth 92 are meshingly engaged with clutch teeth 86. With first shift sleeve 90 in its neutral position, ring gear 38 is free to rotate relative to planet carrier assembly 42 and sun gear 40. However, in the direct drive position, first shift sleeve 90 couples planet carrier assembly 42 for direct rotation with ring gear 38.

Second synchronizer clutch 68 is shown to include a second clutch hub 102 fixed to a splined connection 104 to sun gear shaft segment 60, a brake plate 106 fixed, such as by bolts 108, to housing 34 and having clutch teeth 110 formed thereon, a second synchronizer assembly 112 interposed between second clutch hub 102 and brake plate 106, and a second shift sleeve 114. Second shift sleeve 114 has internal longitudinal spline teeth 116 that are meshed with external spline teeth 118 formed on second clutch hub 102 such that second shift sleeve 114 is supported for rotation with and axial sliding movement on second clutch hub 102 between a neutral position (N) whereat its spline teeth 116 are disengaged from clutch teeth 110 on brake plate 106 and a underdrive position (U) whereat its spline teeth 116 are coupled to clutch teeth 110. Second synchronizer assembly 112 is also shown to be a dual cone strut-type unit that is operable for causing speed synchronization between sun gear 40 and brake plate 106 prior to second shift sleeve 114 moving into its underdrive position. Accordingly, second synchronizer assembly 112 is operable for stopping (i.e., "braking") rotation of sun gear 40 prior to it being coupled to brake plate 106. Second synchronizer assembly 112 is shown to include an inner cone ring 120 fixed by splined connection 122 to sun gear shaft segment 60, a blocker ring 124, and an intermediate cone ring 126.

Second synchronizer clutch 68 is also shown to include a multi-plate clutch pack that is operable for assisting in braking rotation of sun gear 40 relative to housing 34. In particular, the clutch pack includes a plurality of outer clutch plates 128 that are fixed via a splined connection 130 to brake plate 106 and a series of inner clutch plates 132 that are fixed via a splined connection 134 to sun gear 40. Inner clutch plates 132 are alternately interleaved with outer clutch plates 128. Upon initial movement of second shift sleeve 114 toward brake plate 106, energization of second synchronizer assembly 112 causes inner cone ring 120 to move axially for exerting a compressive clamping force on the interleaved clutch pack. Thus, the clutch pack functions in conjunction with second synchronizer assembly 112 for smoothly braking rotation of sun gear 40.

Referring specifically to FIG. 3, the first drive connection is established with first shift sleeve 90 located in its direct drive position and second shift sleeve 114 located in its neutral position. As such, planet carrier assembly 42 is fixed to ring gear 38 while sun gear 40 is free to rotate relative to housing 34. Since ring gear 38 is directly driven by input 18 and planet carrier assembly 42 is directly coupled to output 20, this drive connection results in a direct speed ratio connection between input 18 and output 20, thereby establishing a "direct-drive" mode. Referring to FIG. 4, the second drive connection is established with first shift sleeve 90 located in its neutral position and second shift sleeve 114 located in its underdrive position. As such, sun gear 40 is held stationary while planet carrier assembly 42 is free to rotate relative to ring gear 38. Thus, planet carrier assembly 42 and output 20 are driven at a reduced speed relative to ring gear 38 and input 18, thereby establishing an "underdrive" mode.

To provide means for coordinating movement of shift sleeves 90 and 114, mode shift apparatus 70 includes a shift mechanism 136 and an actuator 138. Shift mechanism 136 includes a shift shaft 140 supported for translational movement in housing 34, a first shift lug 142 fixed to shift shaft 140, and a second shift lug 144 fixed to shift shaft 140. First shift lug 142 includes a shift fork 146 that extends into circumferential groove 148 formed in first shift sleeve 90. Likewise, second lug 144 includes a shift fork 150 that extends into a circumferential groove 152 formed in second shift sleeve 114. As seen, shift shaft 140 is journally supported at one end within a socket 154 formed in housing 34 and supported at its opposite end by a ball screw assembly 156. In particular, ball screw assembly 156 includes a retainer 158 fixed to shift shaft 140 and having a pair of circumferential grooves 160 formed thereon, a ball screw gear 162 having internal threads 164 formed thereon, and a caged ball assembly 166 having a series of balls 168 disposed between grooves 160 in retainer 158 and internal threads 164 in ball screw gear 162. Ball screw gear 162 is shown to be rotatably supported in housing 34 by various bearing assemblies 170. Thus, rotation of ball screw gear 162 in a first direction causes forward non-rotational linear movement of shift shaft 140 while rotation of ball screw gear 162 in a second opposite direction causes rearward non-rotational linear movement of shift shaft 140.

To provide means for rotatably driving ball screw gear 162, ball screw gear 162 meshingly engages a transfer gear 172 which steps down the rotational speed of an actuator output shaft 174 to which transfer gear 172 is also meshed. Preferably, actuator 138 includes a fractional horsepower DC electric motor 176 that is mounted to housing 34 for controllably rotating output shaft 174 in response to an electrical control signal. Suitable bearings 178, 180 are shown for rotatably supporting transfer gear 172 and output shaft 174 within housing 34. Thus, rotation of output shaft 174 in a first direction results in rotation of ball screw gear 162 in its first direction which, in turn, causes shift shaft 140 to move first shift sleeve 90 to its direct drive position and second shift sleeve 114 to its neutral position for establishing the direct drive mode (FIG. 3). Obviously, the opposite direction of rotation of output shaft 174 results in movement of first shift sleeve 90 to its neutral position and second shift sleeve 114 to its underdrive position for establishing the underdrive mode. While a specific structure for shift mechanism 136 and actuator 138 have been disclosed, it will be appreciated that any suitable electro-mechanical or hydro-mechanical shift system is within the anticipated scope of the present invention.

Figure 5:
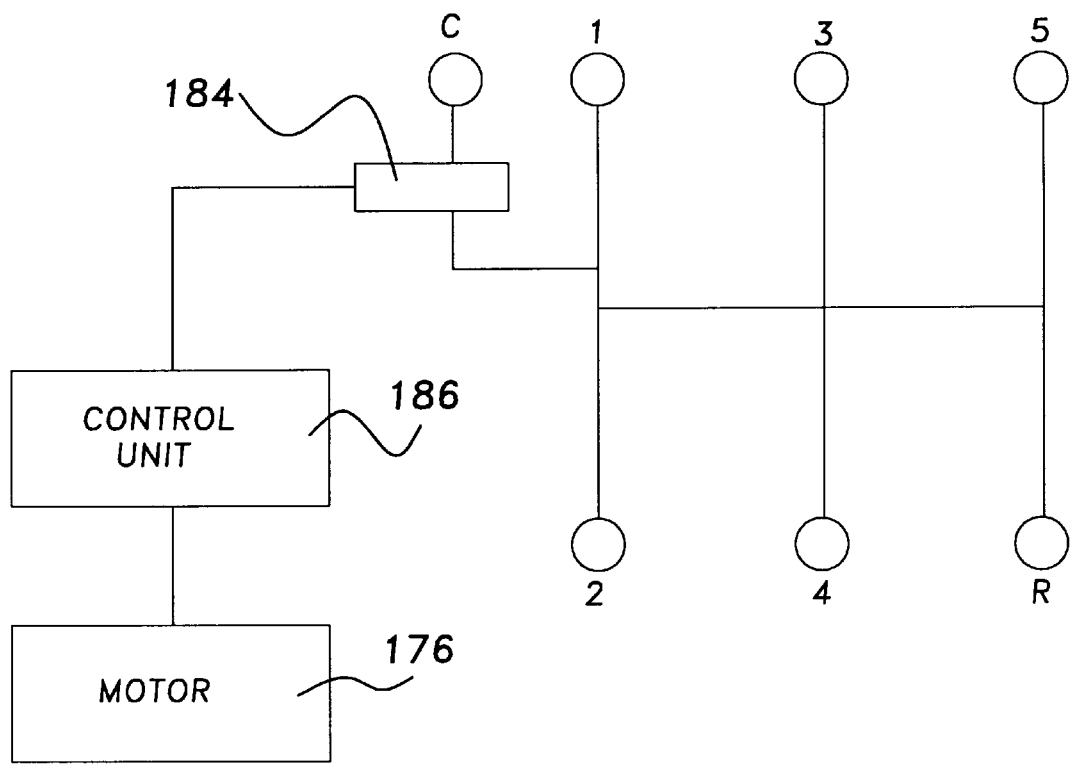
FIG. 5 is a schematic diagram showing a shift pattern that can be employed when the two-speed compounder is mounted to a five-speed manual transmission.

The operation of two-speed compounder 10 will now be described in greater detail. FIG. 5 illustrates a modified shift pattern for a manually-operated gear shift lever 182 (FIG. 1) which permits the vehicle operator to select the additional forward drive ratio that is made available by use of two-speed compounder 10. Preferably, the additional forward drive gear is a creeper gear, identified by reference letter "C" on the shift pattern. A gear select switch 184, provides an input signal to an electronic control unit 186 which, in turn, controls actuation of motor 176 for moving shift sleeves 90 and 114 to the position shown in FIG. 4 when gear selector switch 184 signals selection of the creeper gear. To establish the creeper gear, transmission 12 must be operating in its first forward gear. In particular, electronic control unit 186 would send a signal to motor 176 for rotating ball screw gear 162 in the required direction to move first shift sleeve 90 to its neutral position and second shift sleeve 114 to its underdrive position, whereby drive torque at the underdrive speed ratio is delivered to output shaft 54. However, upon shifting out of the creeper gear, gear selector switch 184 signals control unit 186 to actuate motor 176 for rotating ball screw gear 162 in the required direction to move first shift sleeve 90 to its direct drive position and second shift sleeve 114 to its neutral position, as shown in FIG. 3, for establishing the direct drive mode. Thus, two-speed compounder 10 is maintained in the direct drive mode during operation in the standard first through fifth forward drive ratios and the reverse drive ratio associated with transmission 12. Those skilled in the art will appreciate that additional forward and reverse speed ratios can be made available by controllably shifting compounder 10 between its direct drive and underdrive modes with transmission 12 in any forward gear or reverse gear other than the first gear. Likewise, despite two-speed compounder 10 being disclosed in conjunction with manual transmission applications, it is to be understood that compounder 10 can be used with other types of power transmission devices, such as automatic transmissions to provide additional speed ratios.

The foregoing discussion discloses and describes an exemplary embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A new synchronicer cluch comprising:

a shaft:

a brake drum non-rotatory fixed to a housing and surrounding a portion of said shaft to define an annular chamber therebetween, said brake drum having clutch teeth formed thereon;

a clutch pack located in said clutch chamber and including a set of inner clutch plates mounted for rotation with said shaft and which are interleaved with a set of outer clutch plates mounted for rotation with said brake drum;

a clutch hub fixed for rotation with said shaft and having external spline teeth;

synchronizer assembly disposed between said clutch hub and said brake drum and operable for causing speed synchronization therebetween, said synchronizer assembly including a cone ring mounted for rotation with said shaft and limited axial movement relative to said cluth pack, and a blocker ring supported on said ring; and a shift sleeve having internal spline teeth meshed with external spline teeth on said clutch hub that said shift sleeve is supported for rotation with said clutch hub an axial movement thereon between first and second positions, said shift sleeve is operable to cause axial movement of said cone ring in response to movement between its first and second positions, said shift sleeve is operable in its first position to release its internal spline teeth from meshed engagement with said clutch teeth on said brake drum and locate said cone ring in a position released from engagement with said cluth pack such that said shaft said permitted to rotate to said brake drum, and said shift sleeve is operable in its second position to engage its spline teeth in meshed engagement with said cluth teeth on said brake brake drum and locate said cone ring in a position engaged with said clutch pack to exert a clamping to exert a clamping force thereon such that said shaft is prevented from rotating relative to said drum.

2. The synchronizer clutch of claim 1 whereat movement of said shift sleeve toward its second position causes said cone ring to engage said clutch pack prior to engagement of said spline teeth on said shift sleeve with said clutch teeth on said brake drum.

3. The synchronizer clutch of claim 1 wherein said housing is non-rotatable such that said shaft is braked when said shift sleeve is moved to its second position.

\* \* \* \* \*

UNITED STATES PATENT AND TRADEMARK OFFICE
CERTIFICATE OF CORRECTION

PATENT NO. : 5,975,263
DATED : November 2, 1999
INVENTOR(S) : John R. Forsyth

It is certified that error appears in the above-identified patent and that said Letters Patent is hereby corrected as shown below:

Column 6, line 6, claim 1, delete "new".

Column 6, line 6, claim 1, "synchronicer" should be --synchronizer--.

Column 6, line 6, claim 1, "cluch" should be --clutch--.

Column 6, line 8, claim 1, "non-rotatory" should be --non-rotatably--.

Column 6, line 9, claim 1, after "annular" insert --clutch--.

Column 6, line 24, claim 1, "cluth" should be --clutch--.

Column 6, line 24, claim 1, after "said" (second occurrence) insert --cone--.

Column 6, line 26, claim 1, after "with" insert --said--.

UNITED STATES PATENT AND TRADEMARK OFFICE
CERTIFICATE OF CORRECTION

PATENT NO. : 5,975,263
DATED : November 2, 1999
INVENTOR(S) : John R. Forsyth

It is certified that error appears in the above-identified patent and that said Letters Patent is hereby corrected as shown below:

Column 6, line 27, claim 1, after "hub" insert --such--.

Column 6, line 28, claim 1, "an" should be --and--.

Column 6, line 38, claim 1, "said" (second occurrence) should be --is--.

Column 6, line 38, claim 1, after "rotate" insert --relative--.

Column 6, line 40, claim 1, delete "brake" (second occurrence).

Column 6, line 42, delete "to exert a clamping" (second occurrence).

Column 6, line 44, claim 1, after "said" insert --brake--.

Signed and Sealed this

Sixth Day of March, 2001

Attest:

NICHOLAS P. GODICI

Attesting Officer

Acting Director of the United States Patent and Trademark Office